United States Patent [19]

Kikuchi et al.

[11] Patent Number: 4,746,939

[45] Date of Patent: May 24, 1988

[54] PICTURE RECORDING APPARATUS

[75] Inventors: Masatsugu Kikuchi; Syoji Wakoh, both of Kanagawa, Japan

[73] Assignee: Fuji Xerox Co., Ltd., Japan

[21] Appl. No.: 326,976

[22] Filed: Dec. 3, 1981

[30] Foreign Application Priority Data

May 8, 1981 [JP] Japan .................................. 56-68248

[51] Int. Cl.[4] ............................................ G01U 15/00

[52] U.S. Cl. ................................ 346/153.1; 346/160.1

[58] Field of Search ................. 346/74.2, 153.1, 160.1; 118/657; 355/3 DD, 14 D

[56] References Cited

U.S. PATENT DOCUMENTS 3,437,074 4/1969 Hagopian et al. .................. 355/3 D

*Primary Examiner*—Arthur G. Evans

*Attorney, Agent, or Firm*—Sughrue, Mion, Zinn, Macpeak, and Seas

[57] ABSTRACT

A picture recording apparatus having an endless dielectric belt with a plurality of spaced apart poles thereon has a multiple stylus electrode assembly in contact with an inner surface of the belt. Magnetic fluid or magnetic powder is applied to the belt to form magnetic rise elements on the belt and these rise elements are transferred to a recording sheet thus forming dots thereon by an electrostatic force generated by the assembly electrodes in response to an input signal.

6 Claims, 2 Drawing Sheets

PICTURE RECORDING APPARATUS

BACKGROUND OF THE INVENTION

1. Field of the Invention

The present invention relates to a picture recording apparatus in which magnetic fluid or powder is applied to a belt to form magnetic rise elements thereon. The magnetic rise elements are distributed at a certain spatial frequency, and are caused to flow or fly by an electrostatic force or magnetic force to provide a picture on a recording sheet.

2. Description of the Prior Art

In a conventional picture recording apparatus of this type, as shown in FIG. 1, a recording sheet 8 is interposed between a multiple stylus electrode assembly 3 and a belt 1, and magnetic fluid or powder applied to the belt is caused to flow or fly to the recording sheet according to an input signal applied to the multiple stylus electrode assembly 3, to form a picture on the recording sheet 8. In the conventional apparatus, the distance between the top of each of the rise elements 2 which are formed by the magnetic fluid or powder and the multiple stylus electrode assembly 3 is the sum of the thickness of the recording sheet 8 and the clearance between the top of the rise element 2 and the recording sheet 8. In general, the recording sheet 8 is about 100 μm in thickness. The clearance between the recording sheet 8 and the rise element top must be 50 to 100 μm. Thus, the distance between the rise element top and the multiple stylus electrode assembly is, in general, 150 to 200 μm.

In this case, the recording density is usually of the order of the distance between the rise element top and the multiple stylus electrode assembly; i.e., it is of the order of 5 to 7 pieces/mm. Even if the electrode density of the multiple stylus electrode assembly is increased, the degreee of density of the resultant picture cannot be improved because the pitch is determined by the above-described thickness.

That is, the conventional apparatus suffers from a drawback that the recording density or resolution is low.

SUMMARY OF THE INVENTION

It is therefore an object of the present invention to eliminate the above-described difficulty accompanying a conventional picture recording apparatus. More specifically, an object of the invention is to provide a picture recording apparatus capable of achieving a high recording density.

The specific feature of the invention resides in that, as shown in FIG. 3, a plurality of magnetic poles 10 are provided on an endless dielectric belt 1 in such a manner that they are spaced apart from one another, a multiple stylus electrode assembly 3 is arranged in such a manner that the electrode surface 11 of the assembly is in contact with the inner surface of the endless dielectric belt, magnetic fluid or magnetic powder is struck onto the plurality of magnetic poles to form magnetic rise elements, a recording sheet is arranged in such a manner that it is spaced from the surfaces of the magnetic rise elements thus formed, the endless dielectric belt and the recording sheet are moved in synchronization with each other, and a signal voltage is applied to the multiple stylus electrode assembly.

DESCRIPTION OF THE PREFERRED EMBODIMENTS

One embodiment of the invention will be described with reference to FIGS. 2 and 3 in detail.

Figure 1:
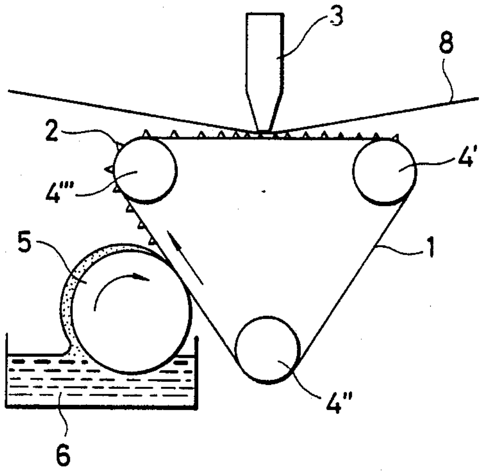
FIG. 1 PRIOR ART
FIG. 1 is an explanatory diagram showing the arrangement of a conventional picture recording apparatus.
Figure 2:
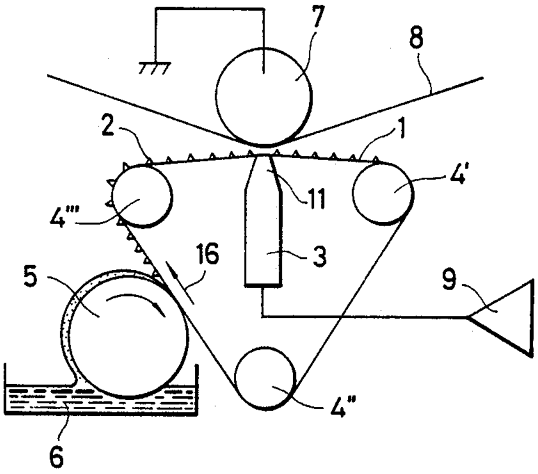
FIG. 2 is an explanatory diagram showing the arrangement of one embodiment of a picture recording apparatus according to the present invention.

As shown in FIG. 2, a belt 1 is driven in the direction of the arrow 16 by drive shafts 4', 4'' and 4'''. As shown in FIG. 3, a magnetic film 13 having a density of $400/mm^2$ which is magnetized perpendicularly to the surface of the belt 1 at a predetermined spatial frequency is formed on the belt 1. A roll 5 is brought into contact with the belt 1 to coat the belt 1 with magnetic fluid 6. The magnetic fluid 6 thus coated forms rise elements 2 according to the spatial frequency of magnetic poles 10. A multiple stylus electrode assembly 3 having an electrode pitch of 12 pieces/mm is arranged in such a manner that it is in contact with the inner surface of the belt 1 and it is applied with a voltage by a drive circuit 9 according to a video signal to be printed. The magnetic fluid 6 of each of the rise elements 2, which correspond to the electrodes to which the voltage is applied, flows onto a recording sheet 8, where a dot is recorded thereby.

Figure 3A:
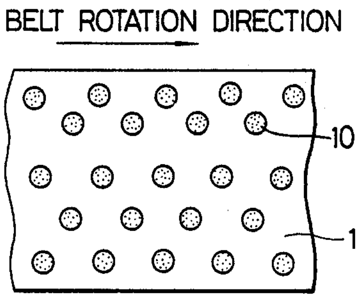
FIG. 3(A) is a plan view showing a part of a belt employed in the present invention, on which magnetic poles are formed.
Figure 3B:
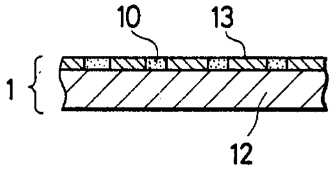
FIG. 3(B) is a sectional view of the belt shown in FIG. 3(A).

In the above-described embodiment, as shown in FIG. 3(A), the belt 1 comprises a support 12 made of "Mylar" (the trade name of a polyester film) which is 30 μm thick, the magnetic poles 10 being formed in the magnetic film 13 which is formed on the support 12 and has a thickness of 20 μm. The distance between the surface of the magnetic film 13 and the recording sheet 8 is 50μ. In this case, an excellent picture having a recording density of at least 12 pieces/mm can be obtained.

As was described above, the picture recording apparatus includes an insulated belt 1 which has a thickness of less than 100μ, preferably less than 50μ, and has a surface coated with the magnetic film which is less than 50μ in thickness and is magnetized inwardly of the surface or perpendicularly to the surface at the predetermined spatial frequency. The means for driving the belt, the means for coating the belt with magnetic fluid or magnetic powder and the multiple stylus electrode assembly are arranged in such a manner that the assembly is in contact with the inner surface of the belt. Means are also provided for applying a voltage to the multiple stylus electrode assembly according to a video signal. The magnetic poles 10 formed on the dielectric belt 1 as shown in FIG. 3 attract the magnetic fluid or magnetic powder 6 to form the rise elements or powder elements 2. The rise elements or powder elements 2 are conveyed by the dielectric belt to the printing part 11 of the multiple stylus electrode assembly, whereupon the signal voltage is applied to the multiple stylus electrode assembly 3 by the drive circuit 9.

Accordingly, in this operation, an electric field is created between the multiple stylus electrode assembly and the (electrically conductive) back roll, and therefore the magnetic fluid or magnetic powder is caused to flow or fly towards the back roll 7 by the action of the lines of electric force which are formed in the electric field.

As a result, the magnetic fluid or magnetic powder sticks onto the recording sheet, thus forming a picture thereon.

In this connection, it should be noted that the dielectric belt 1 is very thin, about 50μ. Therefore, the distance between the surface of the magnetic rise element or magnetic powder element and the surface of the multiple stylus electrode assembly is much smaller than that in the conventional picture recording apparatus, and accordingly the picture recorded by the apparatus of the invention is higher in resolution.

We claim:

1. A picture recording apparatus, comprising:

an endless dielectric belt having a plurality of magnetic poles arranged thereon which are spaced apart from one another;

a multiple stylus electrode assembly having an electrode surface, said surface being in contact with an inner surface of said endless dielectric belt;

means for applying a magnetic fluid or magnetic powder onto said plurality of magnetic poles to form magnetic rise elements on said endless dielectric belt;

means for transporting a recording sheet so that said recording sheet is spaced from top surfaces of said magnetic rise elements;

means for transporting said endless dielectric belt, said endless dielectric belt and said recording sheet being transported in synchronization with each other; and means for applying a signal voltage to said multiple stylus electrode assembly.

2. The picture recording apparatus as claimed in claim 1 wherein said endless dielectric belt comprises a support made of a polyester film, said plurality of magnetic poles being formed in said film.

3. The picture recording apparatus claimed in claim 2 wherein said multiple stylus electrode assembly has an electrode pitch of 12 pieces/mm.

4. The picture recording apparatus claimed in claim 2 wherein said top surface of said magnetic rise elements is about 50 μm from said recording sheet.

5. The apparatus claimed in claim 4 wherein said means for transporting said endless dielectric belt comprises first, second and third drive shafts.

6. The picture recording apparatus claimed in claim 5 wherein said means for applying said magnetic powder or magnetic fluid comprises a roll.

* * * * *